United States Patent
Scherer (10) Patent No.: US 8,991,729 B2
(45) Date of Patent: Mar. 31, 2015

(54) VALVE FOR A SPRAY GUN, SPRAY GUN AND METHOD

(75) Inventor: Dirk Scherer, Lahnau (DE)

(73) Assignee: Wiwa Wilhelm Wagner GmbH & Co. KG, Lahnau (DE)

( * ) Notice: Subject to any disclaimer, the term of this patent is extended or adjusted under 35 U.S.C. 154(b) by 606 days.

(21) Appl. No.: 13/353,370

(22) Filed: Jan. 19, 2012

(65) Prior Publication Data
US 2012/0181347 A1    Jul. 19, 2012

(30) Foreign Application Priority Data
Jan. 19, 2011   (DE) .................. 10 2011 002 878

(51) Int. Cl.
*B05B 1/26* (2006.01)
*B05B 7/04* (2006.01)
*B05B 7/12* (2006.01)
*F16K 11/076* (2006.01)
*F16K 11/085* (2006.01)

(52) U.S. Cl.
CPC ............ *B05B 7/0408* (2013.01); *B05B 7/1263* (2013.01); *F16K 11/076* (2013.01); *F16K 11/0853* (2013.01); *B05B 7/0483* (2013.01)
USPC .......................................... 239/461; 239/569

(58) Field of Classification Search
CPC .......... B05B 1/30; B05B 1/3033; B05B 1/302
USPC ........................ 239/569, 581.1, 582.1, 526
See application file for complete search history.

(56) References Cited

U.S. PATENT DOCUMENTS

| | | | | |
|---|---|---|---|---|
| 4,281,796 A | * | 8/1981 | Fugent et al. | 239/310 |
| 5,356,076 A | * | 10/1994 | Bishop | 239/311 |
| 5,655,714 A | * | 8/1997 | Kieffer et al. | 239/318 |
| 5,954,272 A | * | 9/1999 | Liao | 239/317 |
| 6,471,141 B2 | * | 10/2002 | Smith et al. | 239/10 |

FOREIGN PATENT DOCUMENTS

DE    20104036 U1    6/2001

OTHER PUBLICATIONS

European Patent Office, Search Report, Application No. 12151333.7, May 3, 2012.

* cited by examiner

*Primary Examiner* — Davis Hwu
(74) *Attorney, Agent, or Firm* — Quarles & Brady LLP (57) ABSTRACT

A valve for a spray gun sprays free-flowing media with the use of compressed air. The valve includes a valve housing arrangement and a valve element, wherein the valve element is disposed at least partially in the valve housing arrangement, there being formed in the valve element a mixing chamber for mixing and discharging at least one spray medium with compressed air. The valve element and the valve housing arrangement are constituted such that the valve element can be moved relative to the valve housing arrangement from a first position into a second position, and that at least one spray medium can be fed to the mixing chamber in the first position and compressed air can be fed to the same via the valve housing arrangement in the second position, wherein the valve element is disposed on the valve housing arrangement so as to be rotatable from the first position into the second position.

15 Claims, 4 Drawing Sheets

VALVE FOR A SPRAY GUN, SPRAY GUN AND METHOD

CROSS REFERENCE TO RELATED APPLICATION

The present application claims the benefit of German Patent Application No. 10 2011 002 878.1 filed Jan. 19, 2011, which is fully incorporated herein by reference.

STATEMENT REGARDING FEDERALLY SPONSORED RESEARCH OR DEVELOPMENT

Not applicable.

FIELD OF THE INVENTION

The invention relates to a valve for a spray gun for spraying free-flowing media with the use of compressed air, wherein the valve comprises a valve housing arrangement and a valve element, wherein the valve element is disposed at least partially in the valve housing arrangement, there being formed in the valve element a mixing chamber for mixing and discharging at least one spray medium with compressed air, wherein the valve element and the valve housing arrangement are constituted such that the valve element can be moved relative to the valve housing arrangement from a first position into a second position, and that at least one spray medium can be fed to the mixing chamber in the first position and compressed air can be fed to the same via the valve housing arrangement in the second position.

BACKGROUND OF THE INVENTION

Such valves for spray guns are as a rule formed by a valve housing and a valve element or valve piston disposed in the valve housing. Located in the valve piston is a longitudinal bore which serves as a mixing chamber. Furthermore, transverse bores form supply channels in the valve piston. The valve piston is mounted so as to be longitudinally mobile in the valve housing and can be moved back and forth in the longitudinal direction, for example by means of a further, pneumatic, double-acting piston. In the course of the motion of the valve piston, the supply channel or channels arrive(s) in a position in alignment with a material supply line through which a pressurised spray medium is conveyed into the supply channel and subsequently into the mixing chamber. A further movement of the valve piston leads to closing of the supply channel through, for example, the valve housing and subsequently to opening of the supply channel in a second position, so that compressed air can flow into the supply channel and the spray medium present in the supply channel and in the mixing chamber can be conveyed out of the mixing chamber and atomised or sprayed into the surroundings. For example, two supply channels can be provided, via which one component of a two-component paint can in each case be supplied. Since an alternating motion of the valve piston takes place at a relatively high speed, a virtually uniform delivery of, for example, a paint can take place via the valve and the respective spray gun.

The described arrangement of a valve piston in a cylinder or a valve housing and the relative motion of the valve piston along its longitudinal axis has a number of drawbacks. Since it is not only the valve piston that has to be moved, but also a piston of a pneumatic cylinder for driving the valve piston, a relatively large mass has to be moved, which leads to undesired vibration of a spray gun in operation. Moreover, there is a need for numerous seals in order to seal the valve piston in the valve housing, as well as in the region of the pneumatic cylinder. The rapid, linear motion of the valve piston creates premature wear of the seals and moreover requires sufficient lubrication. In addition, such a valve can only be cleaned with difficulty, since the valve piston has to be connected fixedly to its linear drive. As a rule, therefore, the known valves are therefore designed together with a pneumatic cylinder as a spray gun, i.e. they form a common component due to the formation of a common housing. A replacement of the valve is not therefore possible and the dismantling of the valve piston for cleaning gives rise to an expensive assembly outlay.

SUMMARY OF THE INVENTION

The problem underlying the present invention, therefore, is to propose a valve for a spray gun which can be designed in a straightforward manner and is easy to handle, as well as a method for operating such a valve.

This problem is solved by a valve with a valve housing arrangement and a valve element. The valve element is disposed at least partially in the valve housing arrangement. The valve element includes a mixing chamber for mixing and discharging at least one spray medium with compressed air. The valve element and the valve housing arrangement are constituted such that the valve element can be moved relative to the valve housing arrangement from a first position into a second position. The at least one spray medium can be fed to the mixing chamber in the first position and compressed air can be fed to the same via the valve housing arrangement in the second position. The valve element is disposed on the valve housing arrangement so as to be rotatable from the first position into the second position. In one embodiment of the invention, the valve is incorporated into a spray gun. In another embodiment of the invention, the valve is operated using a method including the step of rotating the valve element from the first position into the second position.

A valve according to the invention for a spray gun for spraying free-flowing media with the use of compressed air comprises a valve housing arrangement and a valve element, wherein the valve element is disposed at least partially in the valve housing arrangement, there being formed in the valve element a mixing chamber for mixing and discharging at least one spray medium with compressed air, wherein the valve element and the valve housing arrangement are constituted such that the valve element can be moved relative to the valve housing arrangement from a first position into a second position, and that at least one spray medium can be fed to the mixing chamber in the first position and compressed air can be fed to the same via the valve housing arrangement in the second position, wherein the valve element is disposed on the valve housing arrangement so as to be rotatable from the first position into the second position.

In contrast with the prior art described at the outset, the valve according to the invention is accordingly constituted such that the valve element performs a rotary motion and not a longitudinal motion. It is in principle irrelevant whether the valve element performs a complete and continuous revolution through 360° or only an alternating rotation through a small angular degree. Merely as a result of the rotation of the valve piston, it is possible to reduce vibrations to a minimum and, in the case of a continuous rotation, to eliminate them completely. In particular, this is brought about by the fact that the valve element can be rotated about its own axis and consequently the whole mass of the valve element does not have to be accelerated to the extent that it does with a longitudinal motion. It is also possible to employ only a few seals and their wear is reduced, since the seals slide on the valve element only in a radial direction and not, as in the case of a longitudinal motion, along a radial outer surface of the valve element. In order to transmit a rotary motion to the valve element from a drive, furthermore, it is no longer necessarily for the valve element to be fixedly coupled with the drive. The valve element can therefore be mobile in the longitudinal direction relative to the drive, which enables the valve to be designed independently of the drive. Moreover, it is also possible with a valve designed in this way to mix and discharge a plurality of spray media simultaneously.

In an embodiment of the valve, there can be formed in the valve element at least one supply channel which connects the mixing chamber to a radial outer surface of the valve element. The supply channel can thus be used to supply a spray medium into the mixing chamber. The supply channel can for example be formed at right angles to a longitudinal axis of the valve element or also obliquely thereto in the valve element in the manner of a bore. The valve element itself can be constituted cylindrical or also with a different shape that enables a rotation of the valve element. A spherical or conical shape, for example, is also conceivable. Shoulders or peripheral grooves as well as protrusions can also be formed on the valve element in the longitudinal direction, as long as the latter do not hinder a rotation. In principle, it is even possible to design the valve element such that it is not rotationally symmetrical, if a complete rotation of the valve element in the valve housing arrangement is not intended.

The valve housing arrangement can comprise for each spray medium a supply device which abuts in a sealing manner against the valve element, and via which the spray medium can be fed to the valve element in the first position. The valve element can thus slide along the supply device, wherein the supply device can be constituted such that friction between the supply device and the valve element is minimized. In order to keep wear of the valve element and/or the supply device as low as possible, use may be made for example of nitride steel as a material for the embodiment. Provision can also be made such that each spray medium to be used has its own supply device, so that mixing of the spray media does not take place until in the mixing chamber. Alternatively, however, it is also possible to feed a plurality of spray media to the mixing chamber using only one supply device. In this case, the supply device can comprise a plurality of media supply lines or channels separated from one another.

The supply device can be constituted as a sealing piston with a coaxial media supply line, wherein the media supply line can be connected in the first position to the supply channel of the valve element and can be closed in the second position by the radial outer surface of the valve element. The sealing piston can be pressed, for example by means of a helical spring, against the radial outer surface of the valve element, so that a particularly good sealing effect is achieved. Furthermore, the sealing piston can be adapted to a shape of the radial outer surface of the valve element in order to improve the sealing effect. In the first position, the spray medium can then be conveyed under pressure through the media supply line into the supply channel and the mixing chamber. Consequently, an alignment of the media supply line with the supply channel thus arises in the first position. A rotary motion of the valve element relative to the sealing piston or the media supply channel brings about a shutting-off of the media supply line with respect to the supply channel by the fact that the radial outer surface of the valve element closes the media supply line. A closure of the media supply line can already take place before the second position of the valve element has been reached.

A compressed air chamber pressurised with compressed air can be constituted as a compressed air supply line between the valve housing arrangement and the valve element, wherein the compressed air supply line can be connected in the second position to the supply channel of the valve element and can be closed in the first position by the radial outer surface of the valve element. As a result of the formation of a compressed air chamber, which can surround the valve element circumferentially, a supply of compressed air into the mixing chamber via the supply channel is facilitated. Alternatively, a compressed air supply line can also be formed, which in the second position arrives directly in a coinciding position with the supply channel of the valve element. If compressed air penetrates into the supply channel and the mixing chamber, the spray medium present therein is conveyed and sprayed into an external region. The valve element is then rotated again into the first position in order to fill the mixing chamber with the spray medium. The compressed air chamber or the compressed air supply line is then shut off with respect to the supply channel.

The valve can for example be designed for mixing and spraying a multi-component material. At least one further spray medium can then be fed via a further supply channel to the mixing chamber in the first position. Accordingly, a supply channel can be formed in the valve element for each further spray medium. The valve can be constituted with two supply channels for two-component materials, with three supply channels for three-component materials etc. The use of an additional spray medium can be enabled for example by a replacement of the valve element and an additional connection of a media supply line to the valve housing arrangement or the valve element without replacement of the whole valve.

If, for example, two spray media are used, two supply devices can be provided, which are disposed lying opposite one another relative to a longitudinal axis of the valve element. Two opposite-lying connections to the valve housing arrangement and supply channels on the valve element can thus be created in a particularly straightforward manner. A uniform supply of two components can thus also be guaranteed.

Accordingly, the supply channels can also be formed lying opposite one another in the valve element, wherein the supply channels can be constituted narrower at the mouth section adjacent to the mixing chamber. A narrowed mouth section can form a nozzle, via which the respective spray medium is sprayed into the mixing chamber in such a way that sufficient mixing with the further spray medium occurs. If the nozzles are constituted in the manner of a bore, the nozzle, i.e. the mouth section of the supply channel, can be adapted individually to a viscosity of the given spray medium by varying a bore diameter. It can thus be ensured that the spray media arrive in the mixing chamber in the desired quantitative ratio.

The mixing chamber can be formed in a particularly straightforward manner if it is constituted rotation-symmetrical, for example as a bore. Good turbulence and mixing of the spray media in the mixing chamber is also achieved if the mouth sections emerge into the mixing chamber in each case radially offset relative to the longitudinal axis of the valve element and to one another. As a result of this eccentric injection of the spray media into the mixing chamber, a rotational movement of the spray media is achieved in the mixing chamber and therefore good mixing. Alternatively, it is also possible to constitute the supply channels and the mouth sections of the respective spray media offset relative to one another in the valve element in the longitudinal direction of the valve element. Particular requirements on mixing or behaviour of the spray media during mixing can thus be taken into account.

The valve can be constituted in a particularly straightforward manner if the valve element can be rotated through an angle α of up to 90° about is longitudinal axis. A rotation of 90° or less causes only slight vibrations and friction. In this case, therefore, the valve element can be moved alternately from the first position into the second position and back again into the first position without a complete rotation of the valve element being performed. Depending on the design of the valve housing arrangement, the valve element can also be rotatable only through a few angular degrees.

The first position and the second position can each be reached at least at reversal points of a rotation. This means that, if a complete rotation of the valve element through 360° does not take place, stopping of the valve element at the respective reversal points is required with a change in the direction of rotation. In principle, however, provision can be made such that the first position and/or the second position is already reached before the respective reversal points are reached.

The spray gun according to the invention comprises a valve according to the invention and a drive device for driving the valve, wherein the valve is connected detachably to the drive device by means of a drive connection arrangement. Since the valve element does not perform a movement in the longitudinal direction, only a coupling of the drive device with the valve by means of the drive connection arrangement is required for the transmission of a rotary motion. It thus becomes possible to connect the valve to the drive device in such a way that the valve is easily detachable from the drive device and vice versa, which considerably simplifies dismantling of the valve for maintenance and cleaning purposes. The spray gun constituted in this way can therefore be formed by two assemblies independent of one another, which enables a modular structure of the spray gun, and this leads to low costs for its production.

It is particularly advantageous if the drive connection arrangement constitutes a form-fit plug-in connection arrangement between the valve element and the drive device. A form-fit plug-in connection arrangement can for example be a polyhedral plug-in connection arrangement. In this case, it is only necessary to plug the drive device to the valve and, if need be, to secure the same with screws.

To advantage, the drive device can comprise a pneumatically driven actuator. Since compressed air must in any case be supplied in order to displace the spray media from the mixing chamber, the actuator can for example also be driven with this compressed air.

Furthermore, the drive device can comprise a rotary slewing drive. In particular, a slewing drive is advantageous especially if a complete rotation of the valve element is not required. A slewing drive also has low moving masses, so that vibrations due to the drive device can be avoided.

Furthermore, a dwell time of the valve element in the given position and a compressed air supply can be controlled by means of a control device of the spray gun. With regard to the compressed air supply, a supply to the drive device of compressed air and a supply of the valve with compressed air can be controlled independently of one another, wherein a functional adaptation of the drive device in the valve can be taken into account by the control device. In order to adapt to different viscosities of spray media, the dwell time of the valve element in the first position can for example be controlled in such a way that the mixing chamber is filled with the required quantity of the spray medium. Furthermore, the dwell time of the valve element in the second position can be selected such that complete blowing-out of the mixing chamber with compressed air can be provided for. Moreover, the control unit is able to ensure that, in a rest position of the valve or the drive device, closure of the mixing chamber with respect to spray media and compressed air is brought about, if need be in a third position.

The method according to the invention for operating a valve for a spray gun for spraying free-flowing media with the use of compressed air is carried out with a valve, wherein the valve comprises a valve housing arrangement and a valve element, wherein the valve element is disposed at least partially in the valve housing arrangement, there being formed in the valve element a mixing chamber for mixing and discharging at least one spray medium with compressed air, wherein the valve element is moved relative to the valve housing arrangement from a first position into a second position, and wherein at least one spray medium is fed to the mixing chamber in the first position and compressed air is fed to the same via the valve housing arrangement in the second position, wherein the valve element is rotated from the first position into the second position.

Further advantageous embodiments of the method emerge from the descriptions of the features of the sub-claims related back to device claim 1.

A preferred embodiment of the invention is explained below in greater detail by reference to the appended drawings.

DETAILED DESCRIPTION OF THE EXAMPLE EMBODIMENTS

A combined view of FIGS. 1 to 4 shows an embodiment of a spray gun 10 (not represented completely here) with a valve 11 and a drive device 12. Valve 11 comprises a valve element 13 with a valve housing arrangement 14. Valve housing arrangement 14 is in turn formed by a valve housing body 15, which constitutes a guide arrangement 16 with radial sealing rings 17 and 18 for a rotation of valve element 13. Threaded bores 19 are formed opposite one another and in alignment in valve housing body 15, into which supply devices 20 for supplying spray media (not represented here) are screwed. Supply devices 20 are each constituted by a connection element 21 for the connection of a pressure line (not shown here) for the respective spray medium and a sealing piston 22 with a sealing element for the sealed seating in the valve element 13. A media supply line 24 is formed in sealing piston 22 and in sealing element 23. Sealing piston 22 is mounted so as to be longitudinally mobile in connection element 21 and sealed with respect to the latter by means of a sealing ring 25. A helical spring 26 generates a pressing force, so that sealing element 23 can be pressed against valve element 13 thereby forming a sealing surface 27. Sealing element 23 is adapted in particular to a cylindrical shape of valve element 13.

Furthermore, there is formed in the valve housing body a compressed air chamber 28 in the manner of a through-bore 29 of threaded bores 19, which surrounds valve element 13 circumferentially. Compressed air chamber 28 can be supplied with compressed air via a channel 30 in valve housing arrangement 14. In order to prevent a movement of valve element 13 in the direction of a longitudinal axis 31, a rear counter-bearing 32 and a front counter-bearing 33 are provided on valve housing body 15. Front counter-bearing 33 is screwed into a threaded bore 34 in valve housing body 15 and thus enables easy replacement of valve element 13 by simple dismantling. Moreover, a nozzle (not shown in detail here), for example for generating a fan jet, can be coupled to front counter-bearing 33 or valve housing body 15.

Valve element 13 is constituted essentially cylindrical and comprises a mixing chamber 35 in the manner of a concentric blind hole 36. Supply channels 38 and 39 for various spray media each emerge into blind hole 36 at an upper end 37 of blind hole 36. Supply channels 38 and 39 are formed at right angles to longitudinal axis 31 and are disposed offset by a dimension x relative to a longitudinal axis 40 of through-bore 29 and longitudinal axis 31. Also formed in supply channels 38 and 39 are respectively mouth sections 41 and 42, which each narrow supply channels 38 and 39. The effect of this is that spray media injected under pressure into mixing chamber 35 form a helical vortex and are thus intensively mixed. A front end 43 of valve element 13 comprises two bores 44 for applying an Allen key (not shown here) as well as a nozzle opening 45 of blind hole 36, from which the mixed spray media can exit atomised, thereby forming a jet. An upper end 46 of valve element 13 forms an external square 47 for the connection with drive device 12. Drive device 12 is a pneumatically driven slewing drive 48 with a shaft 49 and a coupling piece 50. Coupling piece 50 comprises an internal square 51, which is connected in a form-fit manner with external square 47 of valve element 13 and can be separated from one another in a straightforward manner by pulling apart. Furthermore, slewing drive 48 is fastened to valve housing body 15 by means of a flange 57 and screws 53.

Figure 1:
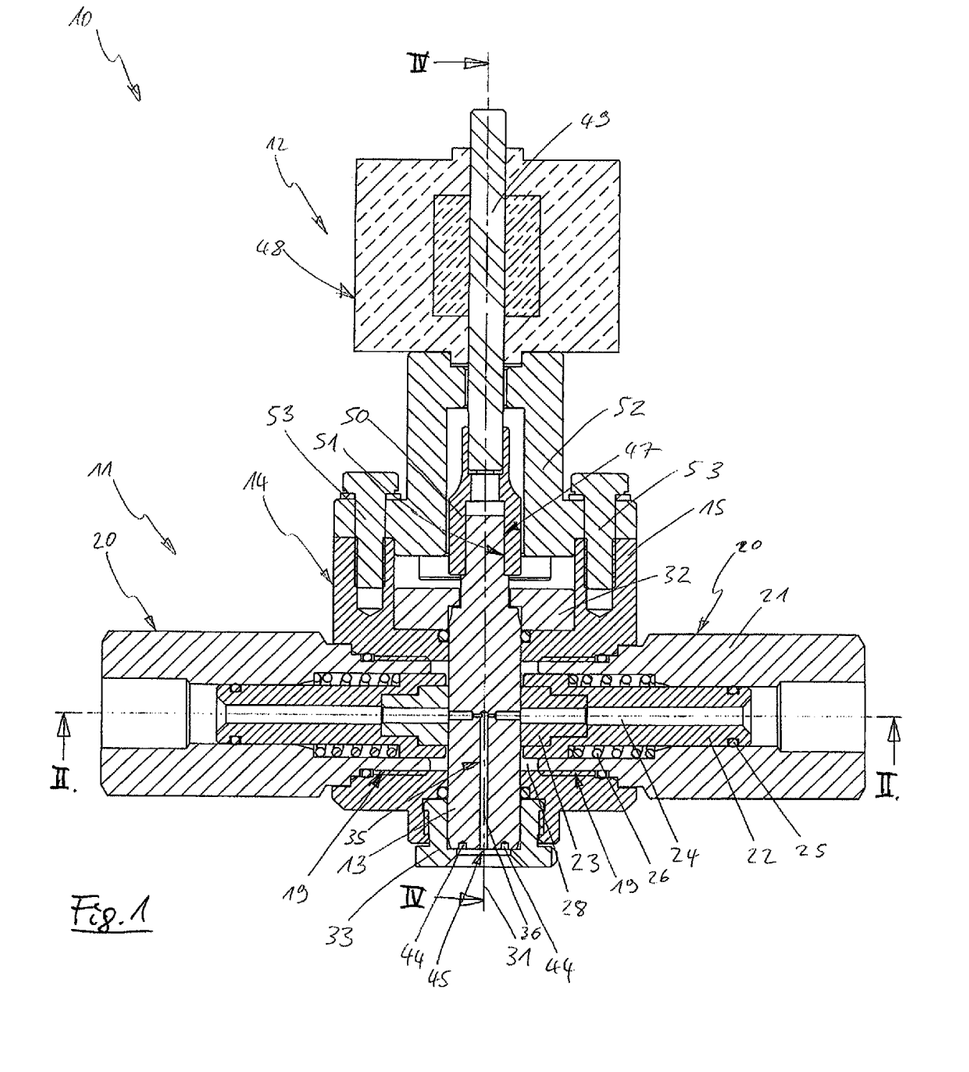
FIG. 1 shows a longitudinal cross-sectional view of an embodiment of a valve with a drive device.
Figure 2:
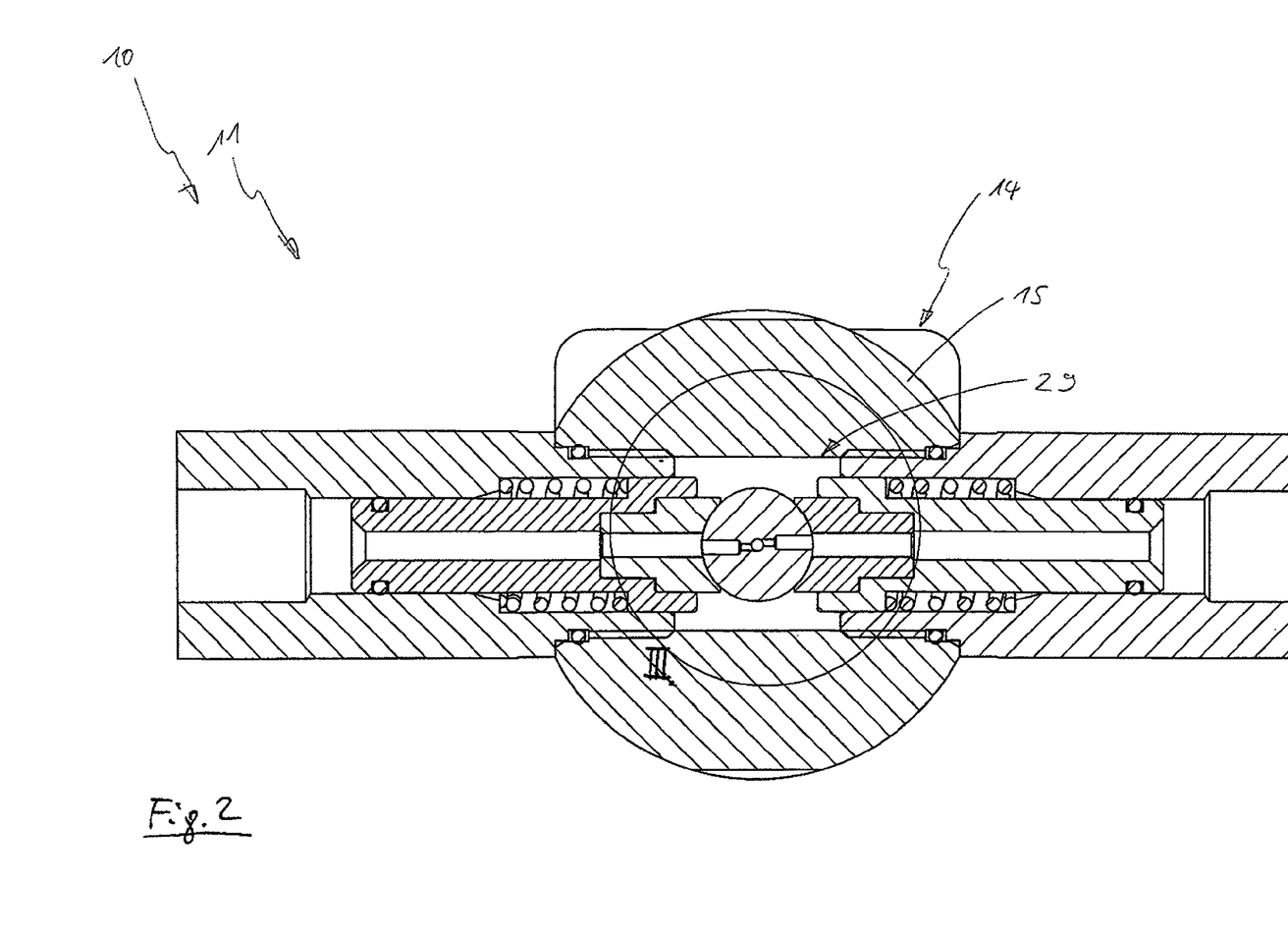
FIG. 2 shows a cross-sectional view along a line II-II from FIG. 1.
Figure 3:
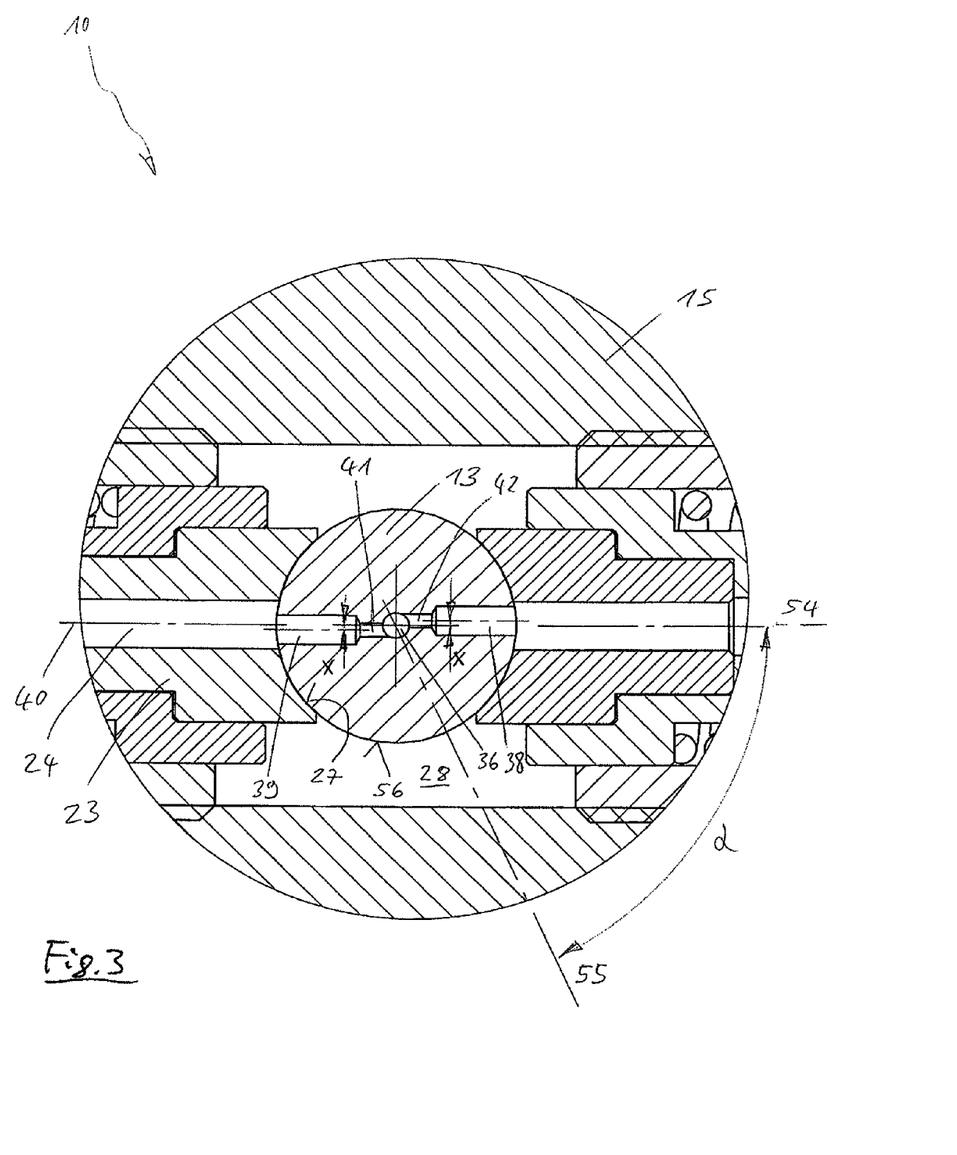
FIG. 3 shows a detail enlargement III from FIG. 2.
Figure 4:
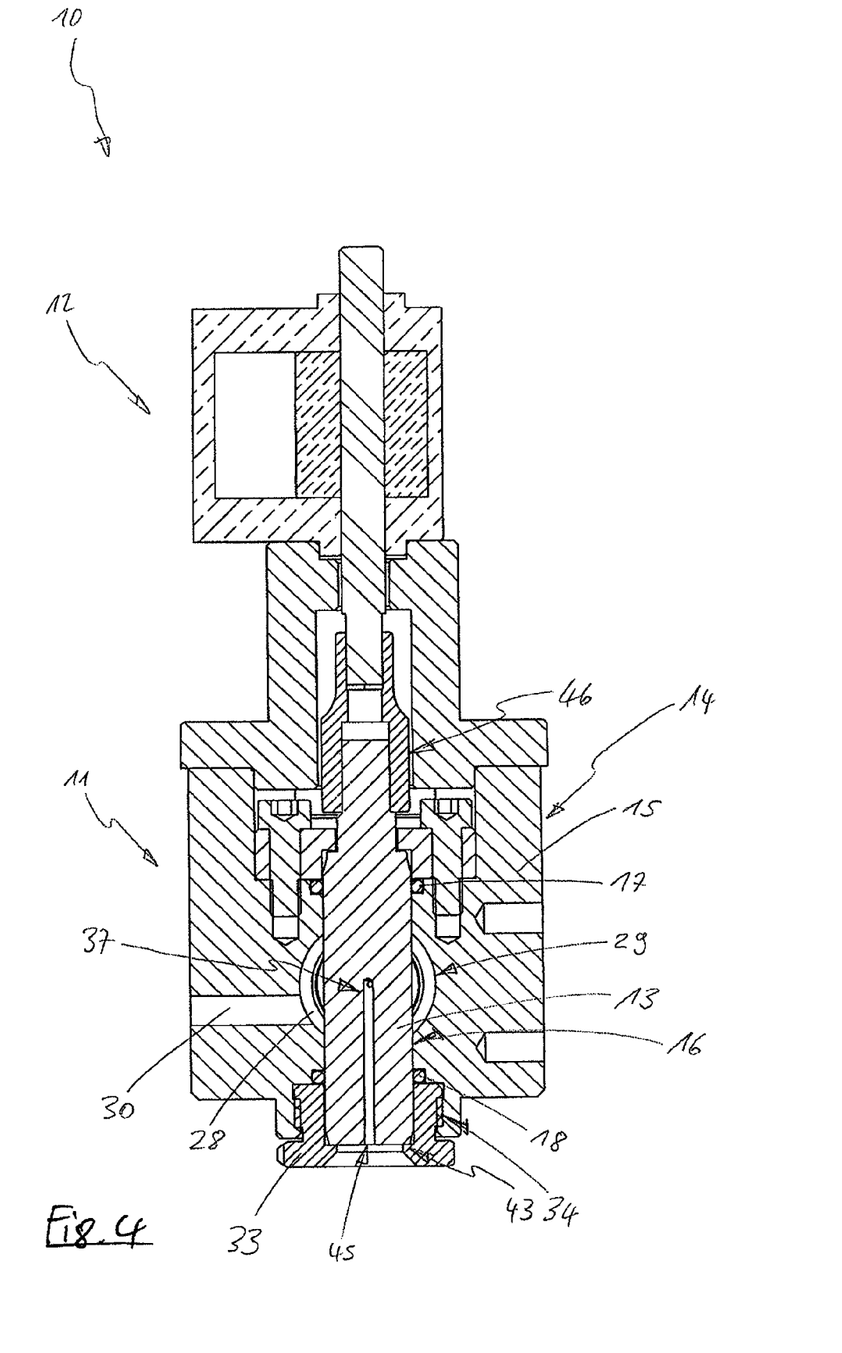
FIG. 4 shows a cross-sectional view along a line IV-IV from FIG. 1.

As can be seen from FIG. 3, valve element 13 is positioned in a first position 54 in the representation show, in such a way that the media supply lines 24 are connected to supply channels 38 and 39, so that the respective spray media can be introduced into mixing chamber 35. Valve element 13 can be rotated about a longitudinal axis 31 through an angle α into a second position 55, which is not represented graphically here and is merely indicated by a dot-dash line, so that supply channels 38 and 39 are connected to compressed air chamber 28. Respective media supply lines 24 are then closed by a radial outer surface 56 of valve element 13. In second position 55 indicated here, compressed air present under pressure in compressed air chamber 28 can flow into supply channels 38 and 39 and subsequently into mixing chamber 35 and can expel and atomise the spray media present therein. Valve element 13 is then again rotated through angle α from second position 55 into first position 54, so that mixing chamber 35 can again be filled with spray media.

The invention claimed is:

1. A valve for a spray gun for spraying free-flowing media with the use of compressed air, wherein the valve comprises:
   a valve housing arrangement; and
   a valve element disposed at least partially in the valve housing arrangement, the valve element including a mixing chamber for mixing and discharging at least one spray medium with compressed air, wherein the valve element and the valve housing arrangement are constituted such that the valve element can be moved relative to the valve housing arraignment from a first position into a second position, and that at least one spray medium can be fed to the mixing chamber in the first position and compressed air can be fed to the same via the valve housing, arrangement in the second position, wherein the valve element is disposed on the valve housing arrangement so as to be rotatable from the first position into the second position; and
   at least one supply channel formed in the valve element and which connects the mixing chamber to a radial outer surface of the valve element, wherein the valve housing arrangement comprises for each spray medium, a supply device which abuts against the valve element in a sealing manner, and via which the spray medium can be fed to the valve element in the first position.

2. The valve according to claim 1, in which the supply device is constituted as a sealing piston with a coaxial media supply line, wherein the media supply line is connected in the first position to the supply channel of the valve element and is closed in the second position by the radial outer surface of the valve element.

3. The valve according to claim 1, in which a compressed air chamber pressurized with compressed air is constituted as a compressed air supply line between the valve housing arrangement and the valve element, wherein the compressed air supply line is connected in the second position to the supply channel of the valve element and is closed in the first position by the radial outer surface of the valve element.

4. The valve according to claim 1, in which at least one further spray medium can be fed via a further supply channel to the mixing chamber in the first position.

5. The valve according to claim 4, in which two supply devices are provided, which are disposed lying opposite one another relative to a longitudinal axis of the valve element.

6. The valve according to claim 4, in which the supply channels are formed lying opposite one another in the valve element, wherein the supply channels are constituted narrower in a mouth section adjacent to the mixing chamber.

7. The valve according to claim 6, in which the mixing chamber is constituted rotation-symmetrical, and the mouth sections emerge into the mixing chamber in each case radially offset relative to the longitudinal axis of the valve element and to one another.

8. The valve according to claim 1, in which the valve element can be rotated through an angle α of up to 90° about its longitudinal axis.

9. The valve according to claim 1, in which the first position or the second position is reached at least at reversal points of a rotation.

10. A valve for a spray gun for spraying free-flowing media with the use of compressed air, wherein the valve comprises:
   a valve housing arrangement;
   a valve element disposed at least partially in the valve housing arrangement, the valve element including a mixing chamber for mixing and discharging at least one spray medium with compressed air, wherein the valve element and the valve housing arrangement are constituted such that the valve element can be moved relative to the valve housing arrangement from a first position into a second position, and that at least one spray medium can be fed to the mixing chamber in the first position and compressed air can be fed to the same via the valve housing arrangement in the second position, wherein the valve element is disposed on the valve housing arrangement so as to be rotatable from the first position into the second position; and
   a drive device for driving the valve, wherein the valve is connected detachably to the drive device by means of a drive connection arrangement.

11. The spray gun according to claim 10, in which the drive connection arrangement constitutes a form-fit plug-in connection arrangement between the valve element and the drive device.

12. The spray gun according to claim 10, in which the drive device comprises a pneumatically driven actuator.

13. The spray gun according to claim 10, in which the drive device comprises a rotary slewing drive.

14. The spray gun according to claim 10, in which a dwell time of the valve element in the given position and a compressed air supply can be controlled by means of a control device of the spray gun.

15. A method for operating a valve for a spray gun for spraying free-flowing media with the use of compressed air, wherein the valve comprises a valve housing arrangement and a valve element, wherein the valve element is disposed at least partially in the valve housing arrangement, there being formed in the valve element a mixing chamber for mixing and discharging at least one spray medium with compressed air, wherein the valve element is moved relative to the valve housing arrangement from a first position into a second position, and that at least one spray medium is fed to the mixing chamber in the first position and compressed air is fed to the same via the valve housing arrangement in the second position, said method comprising:

rotating the valve element from the first position into the second position, wherein the spray gun further includes at includes at least one supply channel formed in the valve element and which connects the mixing chamber to a radial outer surface of the valve element, and the valve housing arrangement includes for each spray medium, a supply device which abuts against the valve element in a sealing manner, and via which the spray medium can be fed to the valve element in the first position.

* * * * *

UNITED STATES PATENT AND TRADEMARK OFFICE
CERTIFICATE OF CORRECTION

| | | |
|---|---|---|
| PATENT NO. | : 8,991,729 B2 | Page 1 of 1 |
| APPLICATION NO. | : 13/353370 | |
| DATED | : March 31, 2015 | |
| INVENTOR(S) | : Dirk Scherer | |

It is certified that error appears in the above-identified patent and that said Letters Patent is hereby corrected as shown below:

IN THE CLAIMS

Column 7, line 65
"arraignment" should be --arrangement--

Column 10, line 10
the second "includes at" should be deleted

Signed and Sealed this
Sixth Day of October, 2015

Michelle K. Lee
*Director of the United States Patent and Trademark Office*